Dec. 28, 1954     J. Z. BRUBAKER     2,698,063
AUTOMATIC OIL FLOW CONTROL FOR ROCKER ARM ASSEMBLIES
Filed Aug. 28, 1951
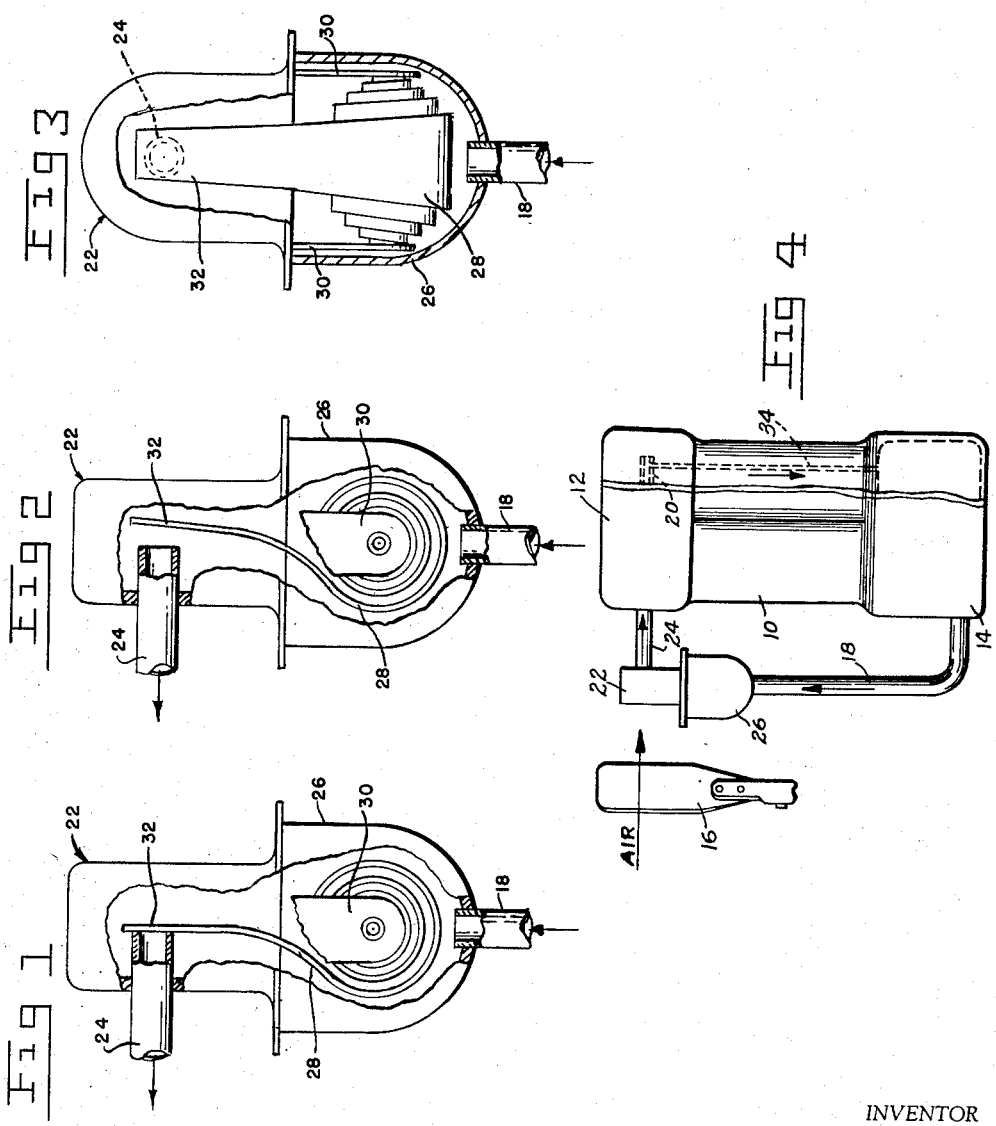
INVENTOR
JACOB Z. BRUBAKER
BY
ATTORNEY

United States Patent Office 2,698,063
Patented Dec. 28, 1954

2,698,063

AUTOMATIC OIL FLOW CONTROL FOR ROCKER ARM ASSEMBLIES

Jacob Z. Brubaker, Manheim, Pa.

Application August 28, 1951, Serial No. 244,001

3 Claims. (Cl. 184—6)

This invention relates to improvements in an automatic oil flow control for the rocker arm assembly of an internal combustion engine.

In modern valve-in-head internal combustion engines in which the valves are mounted within the cylinder head, the rocker arms actuating said valves are lubricated by force feeding lubricating oil from the crank case or other reservoir of oil within the engine to all of the rocker arm bearings in order to insure adequate lubrication thereof. The rocker arm bearings are mounted upon the upper portion of the cylinder head and, in order that recirculation of the lubricating oil will occur, oil return ports or apertures are formed so as to extend through the cylinder head and block, whereby the lubricating oil returns to the crank case or other reservoir. The circulation of the oil is continuous and, particularly when the engine is operated during hot weather conditions and especially at relatively high speeds, the cylinder head sustains temperatures considerably higher than it sustains in cooler weather. The lubricating oil for the rocker arm assembly, when passing through the return apertures in the cylinder head and block frequently becomes heated under these conditions to an abnormally high temperature. Obviously, the excessively heated oil from the rocker arm assembly will serve within a short period of time to raise the temperature of the entire lubricating oil supply of the engine to an abnormally high temperature and thereby decrease the lubricating effect of the oil with the result that the engine bearings are sometimes burned out.

It is an object of the present invention to provide control means within the lubricating oil supply conduit to the rocker arm of a valve-in-head type engine, whereby the supply of oil to the rocker arm assembly is restricted and, consequently, the return of said lubricating oil through the cylinder head and block is likewise restricted so as to prevent overheating of the entire lubricating oil supply of the engine.

It is a further object of the invention to so position the automatically operable thermostatic valve referred to above within the air stream developed by the conventional cooling fan of an internal combustion engine or the normal air stream developed by the movement of a vehicle which is propelled by the engine, whereby the cooling effect of the air stream serves to lower the temperature of and thereby open the valve and the flow of normal temperature lubricating oil through the valve will serve to close it, thereby causing sequential opening and closing of the valve.

Still another object of the invention is to provide an automatically operable thermostatic valve of extremely simple and rugged construction, whereby the incorporation thereof in the lubricating system for the rocker arm assembly will be very inexpensive but will nevertheless result in great savings in engine wear.

Details of the foregoing objects of the invention as well as other objects thereof are set forth in the following specification and illustrated in the accompanying drawing comprising a part thereof.

In the drawings:

Fig. 1 is a side elevation of an exemplary thermostatic valve embodying the principles of the present invention, said valve being partly broken away to illustrate details thereof and also being shown in closed position in said figure.

Fig. 2 is a view similar to Fig. 1 illustrating the valve in open position.

Fig. 3 is an end view of the valve shown in Figs. 1 and 2, the valve casing being partly broken away to illustrate details of the valve.

Fig. 4 is a fragmentary side elevation of a portion of an exemplary valve-in-head internal combustion engine and lubricating system for the rocker arm assembly embodying a valve comprising the present invention.

Referring to the drawings, an exemplary internal combustion engine 10 is shown in Fig. 4 in fragmentary fashion, the same including a rocker arm assembly housing 12 and a crank case 14. A fan 16 is mounted forwardly of the engine 10 as shown in Fig. 4, also in fragmentary fashion, it being understood that the fan is rotated by conventional means and usually by the engine 10. Lubricating oil is transmitted through a conduit 18 from the oil reservoir of the engine such as the crank case 14 to the rocker arm shaft 20 within the housing 12, the shaft being fragmentarily shown in dotted lines in Fig. 4.

In accordance with the present invention, the lubricating oil flows in the direction of the arrow shown in Fig. 4 through conduit 18 to a valve 22 and from the valve through a short tube 24 to the rocker arm assembly within the housing 12. It will be noted from Fig. 4 that the valve 22 is positioned relative to the fan 16 so that it will be within the cooling air stream developed by the fan.

Details of the valve 22 are shown in Figs. 1 through 3, said valve comprising a housing 26. The conduit 18 is connected to the lower end of the housing 26 and the tube 24 is connected to the upper portion of said housing. The valve 22 is of the type which is automatically operable by thermostatic means. Any one of a number of suitable thermostatic means may be used and the present illustration shows an exemplary coiled bi-metallic member 28 supported by a suitable bracket 30 fixed to part of the housing 26 as shown particularly in Fig. 3. The innermost end of the coiled member 28 is fixed to the bracket 30, for example, and the upper end 32 of member 28 is movable relative to the inner end of tube 24 so as to comprise a valve.

For purposes of the present invention, the valve need not necessarily be of the type that effects absolute sealing when closed since it is the principal object of the invention to restrict the flow of oil to the rocker arm assembly, rather than absolutely to prevent the flow of oil, at intermittent intervals. It is also to be understood that the actuating means for the valve may comprise any other suitable type of thermostatically actuated means such, for example, as conventional bellows which operate on an accordian principle.

In an automotive vehicle especially, the engine is usually mounted on a downward incline toward the rear. Lubrication of the rocker arm bearings by a forced-feed system is therefore preferred because if a gravity feed alone were used, the rearmost bearings would be excessively lubricated while the forward bearings would possibly be lubricated inadequately.

During the operation of the present invention, it will be assumed that the engine 12 is being operated to propel a vehicle such as an automotive vehicle or an airplane. Lubricating oil is being forced by the conventional oil pump, not shown, of the engine from the crank case 14, through conduit 18, and to the valve 22. When the engine commences operation, it will be assumed that the oil within the crank case is at normal atmospheric temperature. Under these conditions, the valve 22 will be in open position as illustrated in Fig. 2. By way of example, the bi-metallic member 28 should preferably be of such type that it will be open at a temperature within the range of approximately 130° F. and will close at temperatures exceeding 130° F., the closed position being illustrated in Fig. 1. This temperature range may, of course, be varied for different engines and driving conditions.

Upon starting the operation of the engine, oil will flow through the valve 22 and tube 24 to the rocker arm assembly so as to lubricate the same. One oil return conduit 34 is provided through the cylinder head and block of the engine 10 for such rocker arm, one of these being illustrated in dotted lines in Fig. 4, so as to return the oil from the rocker arm assembly to the crank case 14. Upon the rise in operating temperature of the engine elevating the temperature of the oil, the oil temperature will cause the upper end 32 of the member 28 to move from its open position shown in Fig. 2 to its closed position shown in Fig. 1 when the temperature of the oil reaches approximately 130° F., for example.

It will be understood of course that the lubricating oil completely fills the interior of the housing 26 of the valve 22. After the valve closes as aforesaid, any appreciable flow of oil through the valve 22 ceases, whereby the cooling effect of the air stream produced by the fan 15 as shown in the exemplary embodiment of Fig. 4, will serve gradually to cool the oil within the valve 22 and, upon said temperature receding to approximately 130° F., the valve will open and permit oil again to flow therethrough and to the rocker arm assembly to again lubricate the rocker arms. Such flow will continue for a short interval however until the oil from the crank case 14, which is above 130° F., heats the member 28 sufficiently to close the valve again and the above described cycle is then repeated. The result of the foregoing is that valve 22 sequentially opens and closes and thereby intermittently effects lubrication of the rocker arms within the housing 12.

It is to be understood that under some circumstances, only forward movement of the vehicle which is propelled by the engine 12 will be sufficient to cause a cooling air stream to move past the valve 22 rather than to rely upon the fan 16.

From the foregoing it will be seen that oil returning from the housing 12 through the conduit 24 will be intermittent and the entire volume will be only a very small percentage of that which would normally be circulated if the valve 22 were not present and continuous passage of oil was permitted through the rocker arm assembly in accordance with conventional practice. The oil, in returning through the one or more conduits 34 within the block and particularly within the head of the engine will be heated to higher temperatures than those recommended for normal lubricating purposes of an internal combustion engine. The restriction of said flow by the valve and system comprising the present invention will serve to so reduce said flow of oil through the one or more conduits 34 that no abnormal heating of the entire body of lubricating oil will take place even though the engine is operated at high speeds and particularly during warm or hot weather conditions.

In the preferred embodiment of the invention, the upper end 32 of member 28 engages the inner end of tube 24 to close the valve. Since oil is constantly under pressure within conduit 18 in the direction of the arrow shown in Fig. 4, such pressure will aid in closing said valve and maintaining it closed.

The present invention therefore provides a simple, durable, and inexpensive means for effecting adequate lubricating of the rocker arm assembly of valve-in-head type engines without causing undue heating of the main body of the lubricating oil when operating the engine at high speeds and/or during hot weather. However, during cold weather such as in winter driving and particularly when the engine is started when cold, the valve 22 will be open and permit the flow of oil through the rocker arm assembly and the one or more conduits 34, whereby the oil is quickly heated and will quite rapidly bring the temperature of the lubricating oil within the crank case to normal operating temperatures.

While the invention has been shown and illustrated in its several preferred embodiments, and has included certain details, it should be understood that the invention is not to be limited to the precise details herein illustrated and described since the same may be carried out in other ways falling within the scope of the invention as claimed.

I claim:

1. An internal combustion engine for a vehicle and having valves in the cylinder head thereof and oil return passages through the head and block thereof, rocker arms operable to actuate the same, and an oil line arranged to conduct lubricating oil under pressure from the oil reservoir of the engine to the bearings of said rocker arms and then through said oil return passages to said reservoir, the combination therewith of a thermostatically operable valve connected within said oil line and positioned forwardly of said engine so as to be cooled by an air current moving past said engine when in a moving vehicle, said valve being operable to be closed by heated oil moving therethrough and opened when cooled by said air current, whereby said valve during operation of said motor will sequentially open and close and thereby restrict the flow of oil to said rocker arm bearings and through said oil return passages.

2. An internal combustion engine having valves in the cylinder head thereof and oil return passages through the head and block thereof, rocker arms operable to actuate the same, an oil line arranged to conduct lubricating oil under pressure from the oil reservoir of the engine to the bearings of said rocker arms and then through said oil return passages to said reservoir, and a cooling fan mounted exteriorly of and operable to develop a current of cooling air, the combination therewith of a thermostatically operable valve connected within said oil line and positioned within the air current developed by said fan, said valve being operable to be closed by heated oil moving therethrough and opened when cooled to a predetermined temperature by said air current, whereby said valve during operation of said motor will sequentially open and close and thereby restrict the flow of oil to said rocker arm bearings and through said oil return passages.

3. An internal combustion engine for a vehicle and having valves in the cylinder head thereof and oil return passages through the head and block thereof, rocker arms operable to actuate the same, and an oil line arranged to conduct lubricating oil under pressure from the oil reservoir of the engine to the bearings of said rocker arms and then through said oil return passages to said reservoir, the combination therewith of a thermostatically operable valve connected within said oil line and positioned forwardly of said engine so as to be cooled by an air current moving past said engine when said vehicle is moving, said valve having an exit opening and a thermostatic closure member movable in one direction relative to said opening when the temperature of said lubricating oil reaches a predetermined temperature and said closure member moving in the opposite direction relative to said opening when the temperature of said oil reaches a different predetermined temperature, whereby said valve during operation of said motor will sequentially open and close and thereby restrict the flow of oil to said rocker arm bearings and through said oil return passages.

References Cited in the file of this patent

UNITED STATES PATENTS

| Number | Name | Date |
| --- | --- | --- |
| 1,650,917 | Ward | Nov. 29, 1927 |
| 1,809,357 | Sanger | June 9, 1931 |
| 2,177,724 | Kishline | Oct. 31, 1939 |